(12) United States Patent
Odille et al.

(10) Patent No.: US 6,504,661 B1
(45) Date of Patent: Jan. 7, 2003

(54) OPTICAL DEVICE WITH PROTECTED THIN OPTICAL FILMS

(75) Inventors: Nicolas Odille, Bordeaux (FR); François Lopez, Pessac (FR); Yves Chevallier, Trets (FR); Christophe Venencie, Le Pian Medoc (FR)

(73) Assignee: Thomson-CSF Sextant, Velizy Villacoublay (FR)

( * ) Notice: Subject to any disclaimer, the term of this patent is extended or adjusted under 35 U.S.C. 154(b) by 0 days.

(21) Appl. No.: 09/856,171

(22) PCT Filed: Dec. 3, 1999

(86) PCT No.: PCT/FR99/03012

§ 371 (c)(1),
(2), (4) Date: Jun. 4, 2001

(87) PCT Pub. No.: WO00/34815

PCT Pub. Date: Jun. 15, 2000

(30) Foreign Application Priority Data

Dec. 4, 1998 (FR) .............................................. 98 15357

(51) Int. Cl.⁷ .............................. G02B 5/22; G02B 7/00
(52) U.S. Cl. ....................... 359/892; 359/885; 359/890; 349/106
(58) Field of Search ................................. 359/892, 890, 359/885, 894; 349/106

(56) References Cited

U.S. PATENT DOCUMENTS

| | | | | |
|---|---|---|---|---|
| 3,633,984 A | * | 1/1972 | Smollen ...................... 359/892 |
| 4,415,233 A | * | 11/1983 | Itoh ............................. 359/582 |
| 4,510,190 A | | 4/1985 | Glaeser | |
| 4,965,117 A | | 10/1990 | Lautenschlaeger et al. | |
| 4,969,716 A | * | 11/1990 | Scobey ........................ 359/892 |
| 5,237,447 A | | 8/1993 | Mardesich et al. | |
| 5,812,225 A | | 9/1998 | De Lauzun et al. | |
| 6,157,471 A | | 12/2000 | Bignolles et al. | |

FOREIGN PATENT DOCUMENTS

| | | |
|---|---|---|
| EP | 0 927 904 | 7/1999 |
| GB | 2 003 290 | 3/1979 |
| WO | WO 84/03778 | 9/1984 |

OTHER PUBLICATIONS

U.S. patent application Ser. No. 09/647,919, filed Oct. 13, 2000, pending.
U.S. patent application Ser. No. 09/856,171, filed Jun. 4, 2001, pending.
U.S. patent application Ser. No. 10/148,872, filed Jun. 11, 2002, pending.

* cited by examiner

*Primary Examiner*—Thong Nguyen
*Assistant Examiner*—Leo Boutsikaris
(74) *Attorney, Agent, or Firm*—Oblon, Spivak, McClelland, Maier & Neustadt, P.C.

(57) ABSTRACT

Optical devices using thin optical films to adapt the characteristics of a light radiation. An optical device includes an optical structure and thin optical films interposed in the path of a light radiation that gets propagated towards the optical structure. The optical films are placed in an enclosed space having dimensions that are greater than the dimensions of the optical films so that the latter are maintained by a float mounting that allows each of them freedom of movement. The device prevents mechanical strains created by differential thermal expansion. Such optical devices may find particular application to liquid crystal display screens.

13 Claims, 2 Drawing Sheets

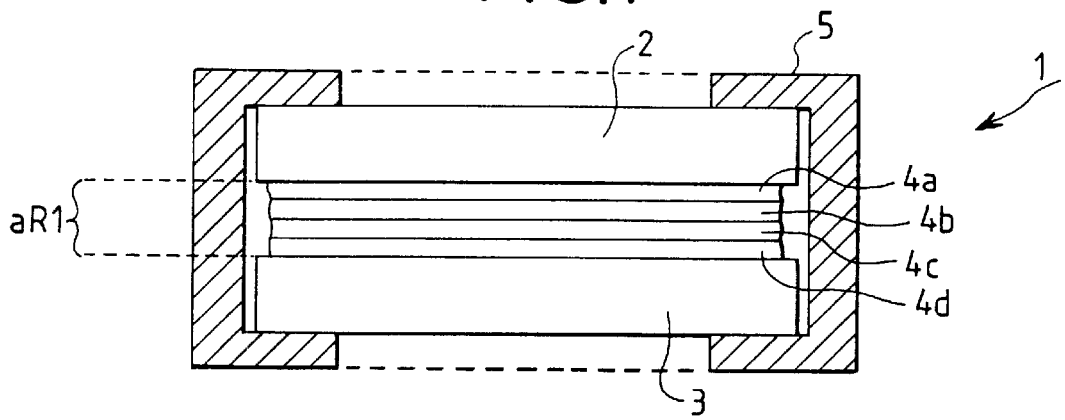
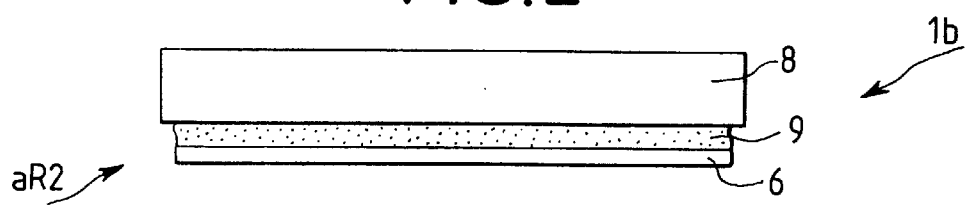
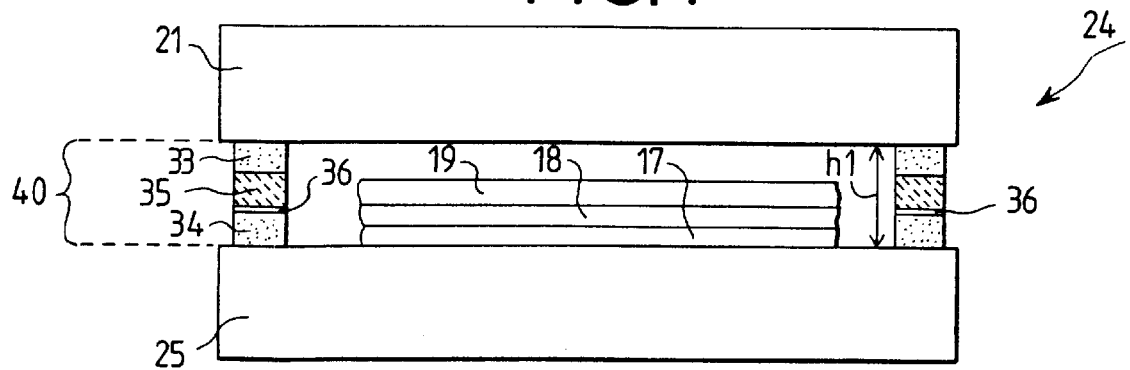

OPTICAL DEVICE WITH PROTECTED THIN OPTICAL FILMS

The present invention relates to optical devices using thin optical films to adapt light radiation to the conditions of operation. The invention is aimed at showing how to mount and use these thin optical films with the minimum risk of deterioration in their optical properties.

Thin optical films are well known components in optical construction. They are used in a wide variety of optical devices, especially in optical structures such as those using liquid crystal display screens.

These thin optical films act on light radiation by giving it characteristics required for operation. They fulfill various functions: for example, the function of scattering light, modifying the angle along which light radiation is transmitted, polarizing light or attenuating light etc. The thin optical films are therefore used to set up an adapter of light radiation. An adapter of this kind may comprise one or more thin optical films, depending on the corrections to be made to the radiation.

Thin optical films generally take the form of very thin films made of plastic (for example polyester, acrylic etc.), with thicknesses ranging for example from 0.05 mm to 0.5 mm approximately. There are mainly two known ways of mounting these thin optical films in an optical structure to form a radiation adapter: one is called the "stacking" method and the other is called the "adhesion" method.

FIG. 1 gives a schematic view of an optical structure 1, comprising a radiation adapter aR1 formed by several thin optical films 4a to 4d mounted according to what is called the "stacking" method. In the non-restrictive example shown, the four thin optical films 4a to 4d are superimposed and each of them fulfils a different function. They are positioned between a first plate and a second plate 2, 3, made of glass for example. In this type of mounting, the two plates 2, 3, and the thin optical films 4a to 4d form an optical sandwich, whose different elements are kept pressed to each other between walls 5 of a mechanical supporting assembly. It must be noted that, in this assembly, all the elements are fixedly joined to each other in a rigid way. This has the effect, in particular, of generating high mechanical strains on the periphery. During storage at high temperature (>50° centigrade) for example, the thin optical films are held fixed on the periphery and therefore cannot expand as they should. They therefore get deformed, forming corrugated features for example.

FIG. 2 gives a schematic exemplary view of an optical structure 1b in which a radiation adapter aR2 has a single optical film 6 carrying out, for example, a scattering function. The optical film 6 is mounted by the method known as the adhesion method. In this mounting, the scattering film 6 is fixedly joined by one of its faces to a transparent plate 8, made of glass for example to which it is joined by means of a layer 9 made of an adhesive substance. In this second mounting, the elements 6,8 are joined fixedly and less rigidly than in the first mounting, by means of a layer 9 of an adhesive substance. This creates mechanical strains in the film and has other drawbacks related to the presence of the adhesive substance.

In both these types of mounting, the thin optical films remain relatively fragile elements with optical characteristics that can easily deteriorate under the effect of factors in the environment in general, such as for example:

temperature variations which may give rise to thermal expansion phenomena having different amplitudes between the glass plates and the thin optical films, causing mechanical strains and deformation that are harmful to optical quality; this defect is more pronounced in the case of mounting by stacking (FIG. 1) than in the case of mounting by adhesion (FIG. 2); the latter however has another drawback that consists of the major risk of defects due to trapped dust, local variations in the thickness of the adhesive substance, blisters, air bubbles etc.

in both forms of mounting, moisture may substantially modify the optical properties of certain optical films; it must be noted that is practically impossible to clean these films without leaving traces that are themselves a cause of disturbance; moisture has particularly harmful effects and is particularly dangerous because the optical films are sensitive to it even after their mounting:

the optical films may also be subjected to chemical corrosion, which may modify their optical characteristics.

It must also be seen that the mounting by itself of thin optical films is constituted by a sequence of lengthy and delicate operations, especially because of the precautions to be taken in the handling of these films. It can thus happen that films undergo irreversible deterioration because of careless or clumsy handling, when they are mounted in the optical structure, but also during intervention on the other elements of the optical device in which these films are mounted.

The above explanations show, firstly, that the implementation of these thin optical films raises many difficulties by itself and, secondly, that even after their mounting, these optical films remain sensitive to the conditions of their environment, and may have characteristics that vary as a function of this environment. It must be noted that this sensitivity to the environment, in certain fields of application, may have considerable importance as is the case for example for optical devices of the type used in aircraft, helicopters etc.

The present invention is aimed not only at facilitating the mounting of these thin optical films in optical devices but also at making them more independent of environmental conditions. To this end, the invention proposes the sheltering of the thin optical films in an enclosed space built in order to contain them and preserve them from environmental corrosion.

The invention therefore relates to an optical device comprising at least one first optical structure, a light radiation adapter comprising at least one thin optical film, the radiation adapter being exposed to a light radiation that it adapts and transmits to the first optical structure, characterized in that it furthermore comprises an enclosed space having transparent walls and containing the said radiation adapter.

The invention will be understood more clearly and other advantages that it provides will appear from the following description, given by way of a non-restrictive example with reference to the appended figures, of which:

FIG. 1, which has already been described, is a schematic view of an optical structure illustrating a first mode of mounting thin optical films;

FIG. 2, which has already been described, shows a schematic view of an optical structure illustrating a second mode of mounting thin optical films;

FIG. 4 is a schematic view of a second embodiment of an adhesive element shown in FIG. 3.

Figure 3:
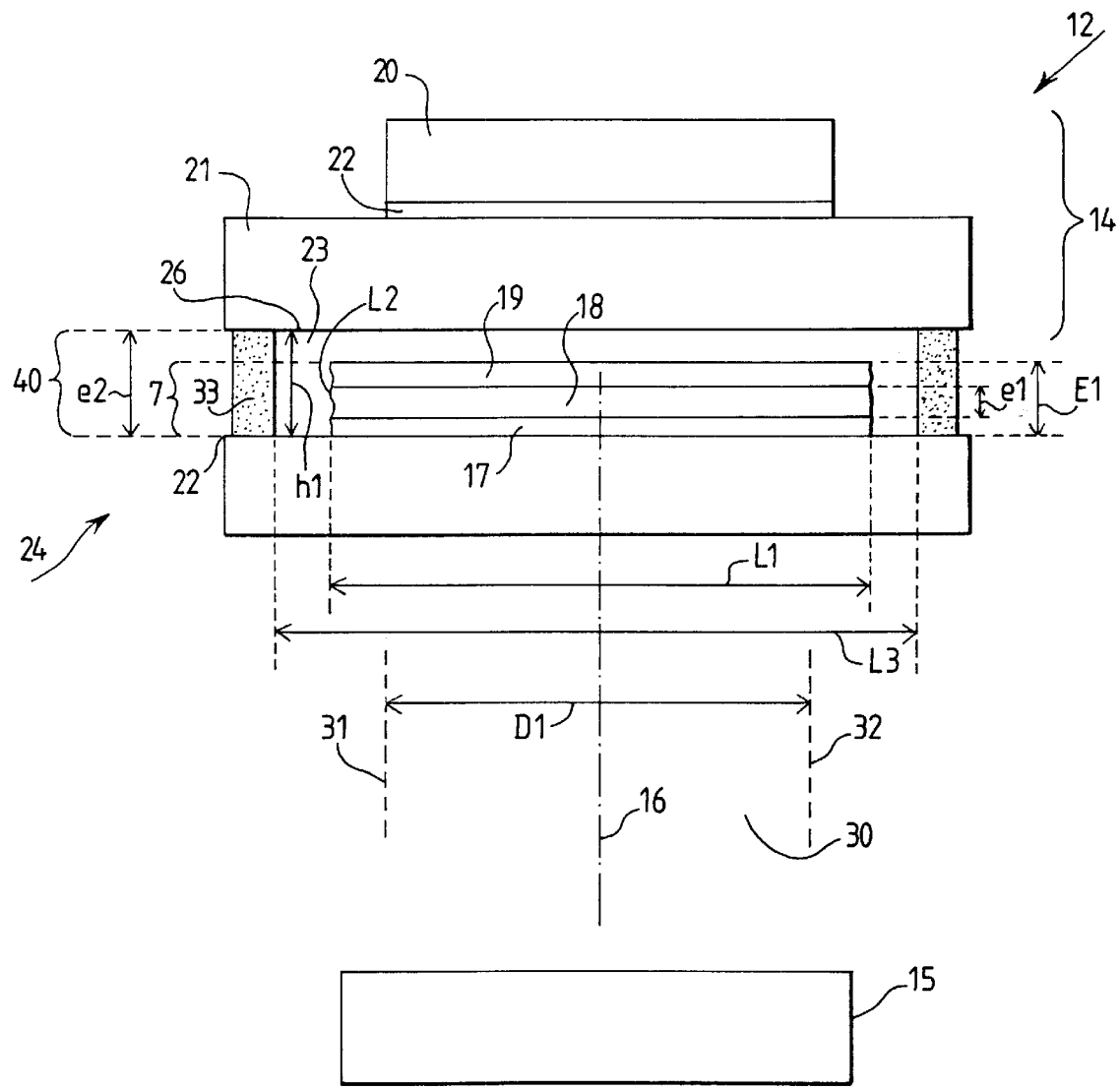
FIG. 3 is a schematic view of an optical device according to the invention, in which a box known as a protection box is shown in a sectional view.

FIG. 3 gives a schematic view of an optical device 12 according to the invention constituted, in the non-restrictive example shown, by a device for the display of liquid crystal screen images. The display device 12 therefore has an optical structure 14 that forms a liquid crystal display screen, a light source 15 delivering a light radiation that is symbolized in the figure by an axis 16 along which this radiation is propagated. The display device 12 furthermore comprises a radiation adapter 7, designed to provide the light radiation 16 with characteristics that are appropriate to the working of the liquid crystal screen 14. In the non-restrictive example shown, the adapter 7 has three thin plastic optical films 17, 18, 19 fulfilling different optical functions, for example: a light-scattering function for the first film 17, a light polarizer function for the second film 18 and an angle compensation function for the third film 19.

The liquid crystal screen 14 has a first glass plate and a second glass plate 20, 21, between which liquid crystal 22 is enclosed. The first plate 20 forms a plate known as the "front plate" generally used as a counter-electrode for the screen 14. The second plate 21 forms a plate known as the "rear plate". This is the plate which generally, in a screen of this kind, bears transistor arrays (not shown) used to define liquid crystal cells and activate them.

The light radiation 16 produced by the source 15 successively crosses the first, second and third thin optical films 17, 18, 19 and then reaches the rear plate 21 with characteristics that are conferred on it by the thin optical films 17, 18, 19. The light radiation 16 is then modulated by the screen 14 to produce images (not shown) displayed on the plate 21 according to a form of operation that is standard per se.

According to one characteristic of the invention, the thin optical films 17, 18, 19 that constitute the adapter 7 are arranged in the inner space 23 of a box known as a protection box 24. The protection box 24 comprises a first transparent wall 25, formed by a plate made of glass or plastic for example, oriented towards the light source 15. The light radiation 16 penetrates through this plate. A second wall 26 of the box 24, opposite the first wall 25, is also transparent to transmit the light radiation 16. The protection box 24 is closed laterally, on its side 22, by elements that are preferably (but not obligatorily) opaque to light.

The two big opposite faces that form the first and second transparent walls 25, 26 of the box 24, may each be constituted by a partition wall or plate that is independent (like the one formed in FIG. 3 by the first wall 25), sufficiently rigid and smooth, made of materials such as glass or plastic for example, having a thickness of some tenths of an mm and possible going up to substantial thicknesses of some mm to some cm. However, either of these walls 25, 26 or both of them may also be constituted by a partition wall that is already used to form another optical elements. This is of course possible provided, firstly, that the partition wall of this kind is positioned on the path of the light radiation 16, at a position that is compatible with the position that must be occupied by the thin optical films 17, 18, 19 and, secondly, that a partition wall of this kind has dimensions greater than those of the thin optical films 17, 18, 19.

In the non-restrictive example shown, the rear plate 21 of the liquid crystal screen 14 fulfils the conditions mentioned here above, and it is therefore used to form also the second wall 26 of the box 24. This provides an advantageous arrangement by which it is possible, at the practical level, to obtain a saving of a transparent wall as well as of the means to position and fix the protection box 24.

In the non-restrictive example shown in FIG. 2 the first wall or partition 25 is dedicated solely to the box 24 but could also be constituted by an element that already fulfils another function, such as for example an optical lens (not shown) of the kind that can be used in imaging devices having an architecture different from that of the optical device 12. Furthermore, it is quite possible for the two transparent faces or walls 25, 26 of the box 24 to be constituted by optical lenses.

According to a major characteristic of the invention, the protection box 24 maintains the thin optical film or films that it contains at the position that they must occupy in order to act on the light radiation without exerting strains on these films. The thin optical films 17, 18, 19 are then held in a type of mounting known as "float mounting".

To obtain this kind of a mounting, known as "float mounting", of the optical films 17, 18, 19, firstly:

the thin optical films 17, 18, 19 are given substantially a same format and same dimensions along their length L1 and their width L2 (the width does not appear in the figure because it extends perpendicularly to the plane of this figure); these optical films however may have different thicknesses e1, suited to their function;

secondly, the inner space 23 of the box 24 is given dimensions slightly greater than those of the optical films, in taking account of the maximum dimensions that these optical films can attain by thermal expansion as a function of the temperatures to which they might be subjected: for example a length L3 and a width L4 (the width L4 does not appear in the figure because it extends perpendicularly to the plane of this figure) of the inner space 23, are obligatorily slightly greater (a value of some tenths of an mm is generally sufficient) respectively than the length and width L1, L2 of the optical films 17, 18, 19;

this is also the case with respect to the height h1 of the inner space 23, namely the dimension which, in this space, extends in the direction of an overall thickness D1 corresponding to the sum of the thicknesses e1 of the thin optical films 17, 18, 19 (the term "overall thickness" is understood to mean the sum of the thicknesses as well as a single thickness if the adapter 7 comprises only one thin optical film): this height h1 of the inner space 23 is therefore obligatorily slightly greater (by some tenths of a mm in general) than the thickness E1 corresponding to the overall thickness of the optical film or films 17, 18, 19 in taking account of the possible thermal expansion of these films.

In this configuration, since the thin optical films 17, 18, 19 are not mechanically held to each other or to the walls 25, 26, each of them has freedom of movement. This freedom of movement prevents the serious problems of thermal expansion (whether differential or otherwise) encountered in the prior art. However, in order that the float mounting may ensure and maintain an accurate positioning of the thin optical films 17, 18, 19, it is necessary that the differences dL, dE (not illustrated in the figure) between the dimensions L3, L 4 of the inner space 23, and the dimensions L1, L2 (dL=L3−L1, dE=h1−E1) of these thin optical films should remain small; for example, some tenths of an mm in addition to the dimensions L1, L2, D1 are sufficient to provide for the independent holding and movement of each thin optical film 17, 18, 19, given the levels of thermal expansion.

To keep an accurate positioning of the thin optical film of films 17, 18, 19, according to one characteristic of the invention, the dimensions of the thin optical film or films considered in a plane substantially parallel to the propagation of the light radiation 16, namely the length and width L1, L2, are greater than the dimensions contained in a useful section 30 of the light radiation 16. The term "useful section" is understood to mean the part of the section of this radiation which, after having crossed the thin optical films 17, 18, 19, is effectively used to form an image (not shown) that is displayed by the front plate 20 of the screen.

FIG. 3 shows two lines of dashes 31, 32 that symbolize the boundaries of the useful section 30 of the radiation 16, and define a dimension D1 in this useful section 30 that is parallel to the lengths L1 and L3 of the optical films and of the inner space 23. Two other boundaries (not shown) of the useful section 30 define a dimension in the latter (not shown) that extends in parallel to the width L2, L4 of the optical films and of the inner space 23.

Thus, taking for example the positioning of the thin optical films 17, 18, 19 parallel to their length L1: if first of all the length L1 of the optical films when it is the minimum (before thermal expansion) is greater than the dimension D1 of the useful section 30; and if, secondly, a difference dD not shown the figure) between the length L1 of the films and the dimension DI of the useful section 30 is itself greater than the difference dL (dD>dL) presented between the length L2 of the inner space 23 and the length L1 of the optical films 17 to 19, then, under these conditions, for a movement of any of the optical films 17 to 19 in the inner space 23, even with the maximum possible amplitude, this optical film will always keep the position in which it continues to act on the entire useful section 30 of the light radiation.

According to another characteristic of the invention, the protection box 24 is imperviously closed on its sides 22 in such a way that the optical film or films 17 to 19 are contained in a confined atmosphere, protected especially from dust, moisture or even streaming, fouling and chemical corrosion.

According to another characteristic of the invention, the sides 22 of the protection box 24 are enclosed by one or more adhesive elements 40, forming a double-face adhesive unit constituted by at least one double-face adhesive film. In the non-restrictive example shown in FIG. 3, the adhesive element 40 consists of a single double-face adhesive film 33 that is standard per se.

It is common practice to use adhesive films consisting of a substance that has a property of strongly adhering to the surfaces against which it is pressed. Double-face adhesive films are adhesive on each of their two faces and can therefore be used to join two objects. They are easy to cut and are commercially available in different dimensions, ranging in width from some centimeters to several tens of centimeters. They are also available in a wide range of thicknesses, ranging for example from some tenths of an mm to several tens of mm. These double-faced adhesive films are commercially distributed for example by the firm "3M" under the title "VHB 3M". They are available especially in two forms:

in the first form, the double-face adhesive film comprises a flexible film used as a backing, each face of which is coated with the adhesive substance as defined here about. They generally take the form of rolls, with the adhesive film being wound on itself with a film (Teflon for example) to which the substance practically does not adhere.

in its second form, the double-face adhesive film is formed solely by the mass of adhesive substance; for its storage, it cooperates here too with a film to which it adheres very slightly to form a roll. Two objects can thus be joined, each object adhering to one of the faces of the same layer of adhesive substance.

Thus, the term "double-face adhesive film" is understood to designate both the case of a double-face adhesive film formed by a backing film coated with an adhesive substance on each of its faces and the case of a single layer of adhesive substance without a backing film capable of adhering by each of its faces.

In the example of FIG. 3, the box 24 is closed by a double-face adhesive film 33 whose thickness e2 determines the spacing between the plates 21 and 25 that form the box 24. This spacing constitutes the height h1 of the inner space 23. The double-face adhesive film 33 is therefore positioned on the periphery of the plates 21, 25 and demarcates the inner space 23.

The use of a double-face adhesive element 40 to close the sides of the box 24 has the advantage especially of easily and directly achieving a tightly sealed closure. Another advantage is that it is relatively easy to find, depending on the overall thickness El of the thin optical films 17 to 19, a double-face adhesive film having the thickness e2 that is suitable for obtaining the height h1 of the space containing these films. In order to obtain the desired tight sealing under difficult operating conditions, it is also possible to supplement the adhesive capacity of the double-face adhesive film by a force obtained by mechanical pressure exerted on the periphery of the box 24, using means that are standard per se (not shown).

In this configuration, the installation of the adapter 7, namely the optical films 17 to 19, in the protection box 24 is done in three main steps:

1. The double-face adhesive element 40 is deposited on one of the supports, namely one of the plates 21, 25,
2. The thin optical films 17 to 19 are deposited, possibly after operations for conditioning these films, if these operations are necessary (these operations are explained in greater detail here below);
3. The other plate 21, 25 used to constitute the plate 24 is set in position.

It must be noted that tests may prove to be useful, depending especially on the nature or composition of the thin optical films, for placing these films in the protection box 24 after they have been adapted, if necessary, to being installed in a confined space. It is possible for example that:

the material of certain thin optical films 17 to 19 will degas and that the degassed substance will create a troublesome adhesion zone with another substrate or optical film, capable of disturbing the optical operation of the adapter 7;

or else the degassed substances may prompt a hot chemical reaction with another optical film; in such cases, the optical films 17 to 19 should be made to undergo a pre-stoving operation whose temperature and duration must be defined for each film by simple tests.

In order to prevent problems of electrostatic adhesion between several confined optical films, it may also be useful to place each of the films, for example for one minute, in an air ionizer before installing them in the protection box 24.

It may be necessary to open the protection box 24, for example to recover the transparent plate 21 which also belongs to the liquid crystal screen 14. The separation of the plates 21 and 25 may be made difficult, because of the ageing of the double-faced adhesive element 40. To facilitate this separation of plates or supports that form the box, the invention provides for joining these two plates 21, 25 by means of an adhesive element 40 positioned so as to have a zone of lower adhesion.

FIG. 4 gives a schematic illustration of this arrangement, according to the invention, of the adhesive element 40, by showing only the two plates 21, 25 that form the box 24 in a view similar to that of FIG. 3.

In the embodiment shown in FIG. 4, the adhesive element 40 is constituted by an association of two double-faced adhesive films 33, 34 and a layer 25 of a different material, forming an intermediate substrate. Thus a sandwich structure is made, with the intermediate substrate 35 located between the two double-faced adhesive films 33, 34. The external face of the adhesive film 33 adheres to the transparent plate 21 and the external face of the adhesive film 34 adheres to the plate 25. The intermediate substrate 35 may be made of fiberglass for example.

The area of lower adhesion is obtained by a layer known as a lining layer 36 with which the intermediate substrate 35 is lined. The lining layer 36 has the function of limiting the clinging capacity of the adhesive substance and, for this purpose, it is relatively smooth. A lining layer 36 made of Teflon fulfils this function very efficiently.

The presence of the lining layer 36 can therefore be used to obtain a far more easy separation of the two transparent plates 21, 25 from each other. However if, despite the presence of the lining layer 36, it proves to be difficult to separate the two plates 21 and 25, for example because of excessively great ageing time of the adhesive element 40, this separation can be done by means of a tool, for example steel wire (not shown) inserted between the two plates, a translation of this steel wire achieving the cutting of the adhesive element 40. An intermediate substrate 35 made of fiber glass is valuable because, in such a case, the glass fibers show excellent behavior provided that the direction of cutting is oriented to the least possible extent in the direction of the fibers but rather, for example, at 45 degrees to the fibers.

It must be noted that a sandwich of the kind, constituted by the double face adhesive films 33, 34 and the intermediate substrate 35, may also be used for the best possible adjustment of the height h1 of the inner space 23 and that, to this end, the double face adhesive film 33, 34 and intermediate substrate 35 may have identical or different thicknesses.

This description of the invention has been made with reference especially to a liquid crystal screen image display device. However, it is clear that the invention can be applied to any type of optical device provided that it uses at least one thin optical film to provide a radiation with the characteristics needed for the working of this device.

What is claimed is:

1. Optical device comprising at least one first optical structure, a light radiation adapter comprising at least one thin optical film such that, when the radiation adapter is exposed to light radiation, it adapts characteristics of said radiation and transmits it to the first optical structure, the device furthermore comprising an enclosed space having transparent walls and containing said radiation adapter, wherein said at least one thin optical film that the adapter comprises are positioned in the enclosed space so as to be superimposed in a float mounting that leaves each thin film a degree of freedom of movement, the enclosed space having dimensions that are slightly greater than dimensions of the thin optical films, in taking account of maximum dimensions that said films can attain by thermal expansion.

2. Optical device according to claim 1, wherein a thickness of each of the thin optical films is added to constitute an overall thickness.

3. Optical device according to claim 2, wherein the enclosed space comprises a height, greater than said overall thickness which is contained in the height.

4. Optical device according to claim 1, designed to be illuminated by a source of light radiation, the light radiation comprising boundaries, that correspond to a useful section of the radiation, wherein the useful section has dimensions smaller than the dimensions of the thin optical films with differences that are greater than differences presented between the dimensions of the enclosed space and the dimensions of the thin optical films.

5. Optical device according to claim 1, wherein the enclosed space is constituted by an inner space of a protection box.

6. Optical device according to claim 1, wherein the enclosed space is constituted by an inner space of a tightly sealed protection box.

7. Optical device according to claim 5, wherein the protection box comprises two transparent plates, at least one of which belongs to another optical structure.

8. Optical device according to claim 5, wherein the protection box comprises two transparent plates forming main faces, and in that sides of the protection box are closed by an adhesive element comprising at least one double-face adhesive film.

9. Optical device according to claim 8, wherein the adhesive element comprises at least one sandwich formed by two double-face adhesive films between which an intermediate substrate is placed.

10. Optical device according to claim 9, wherein the intermediate substrate is made of glass fibers.

11. Optical device according to claim 9, wherein a face of the intermediate substrate is lined with a layer on which the adhesion of an adhesive substance is diminished.

12. Device according to claim 1, wherein the optical device is an image display device comprising a liquid crystal display screen..

13. Device according to claim 12, wherein the liquid crystal display screen comprises a transparent rear plate that also constitutes one of the two plates of the protection box.

* * * * *